Jan. 10, 1956    E. W. HAWKINSON    2,729,851
MOLD FOR RETREADING PNEUMATIC TIRE CASINGS
Filed Oct. 9, 1952
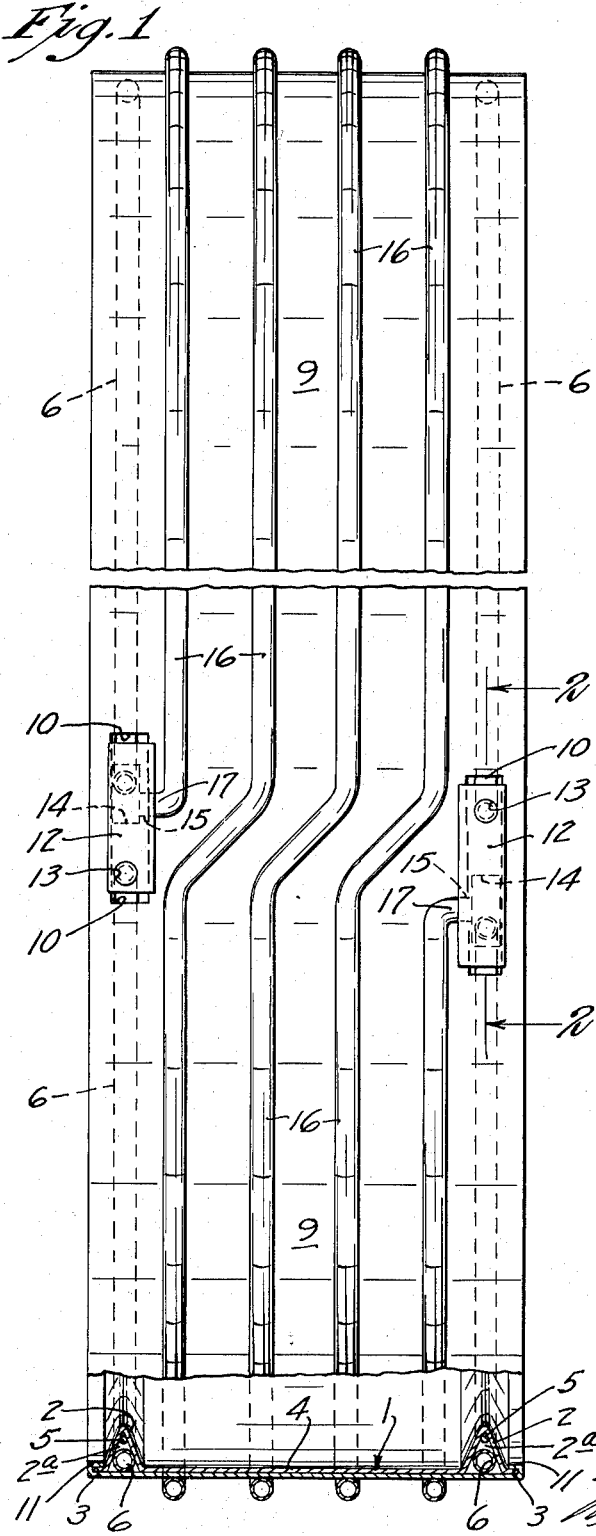
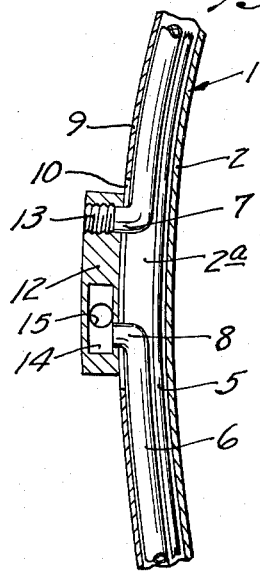
INVENTOR.
Earle W. Hawkinson
BY
Merchant & Merchant
ATTORNEYS

United States Patent Office 2,729,851
Patented Jan. 10, 1956

2,729,851

MOLD FOR RETREADING PNEUMATIC TIRE CASINGS

Earle W. Hawkinson, Minneapolis, Minn., assignor to Paul E. Hawkinson Company, Minneapolis, Minn., a corporation of Minnesota Application October 9, 1952, Serial No. 313,869

1 Claim. (Cl. 18—18)

My invention relates to devices for applying treads to pneumatic tire casings and provides a highly efficient light-weight tire retreading mold of the type broadly disclosed and claimed in Patents 1,917,262 and 2,339,696.

In late years, for the purposes of appearance, the tread material confining flanges adjacent the opposite sides of molds of the above type have been radially deepened so as to extend over the shoulders of the tires to some extent. This practice constitutes a reversion, to some extent, to the earliest type tire retreading and recapping molds. In any event, I have found that with molds of the "Hawkinson" type, whereby heat is imparted to the molds only through a tubular conduit would spirally about the external peripheral surface of the cylinder-like matrix, that insufficient heat is imparted to the radially inner-most portions of the confining flanges. Particularly is this true in "Hawkinson" molds of the type disclosed in Patent 2,339,696, wherein the tubular heating conduits are secured to a reinforcing jacket clamped tightly around the peripheral surface of the matrix.

The object of my invention is the provision of a novel means, whereby the heat may be imparted directly to the radially innermost portions of the tread material confining flanges, and the over-all efficiency of molds of this type is increased.

More particularly, my invention provides novel means for applying heating conduits directly within the V-shaped nest provided by the confining flanges in sheet metal matrices having a cylinder-like reinforcing jacket thereabout.

The above and still further objects of my invention will become apparent from the following detailed specification, appended claim and attached drawings:

Referring to the drawings wherein like characters indicate like parts throughout the several views:

Fig. 1 is a view in plan, some parts being broken away and other parts shown in transverse section; and Fig. 2 is an enlarged fragmentary view in section taken on the line 2—2 of Fig. 1.

Referring with greater particularity to the drawings, the numeral 1 indicates a tire retreading matrix formed from sheets metal of a suitable thickness or gauge and formed to provide V-shaped continuous parallel tread material confining flanges 2 adjacent its opposite side edges 3. As shown, the side edge portions 3 project laterally outwardly from the confining flanges 2 to provide continuous cylinder-like lips in the same plane as the portion 4 intermediate the confining flanges 2.

Endless wire rings 5 are preferably inserted in the bottoms of the cavities 2a of the confining flanges 2. Thereafter, lengths of tubular heating coil 6 are wound about the matrix 1, one each being nestingly received within each of the V-shaped cavities 2a, provided by the confining flanges 2. It will be noted that the adjacent ends 7 and 8 of the conduits 6 are bent so as to project and extend radially outwardly from the cavities 2a in closely spaced relationship to each other. It will be likewise noted that the conduits 6 do not extend radially outwardly above the level of the cavities 2a. Preferably, solder is freely used to secure the tubular portion 6 to the interior of the confining flanges 2 so as to increase heat transfer from the tubes 6 to the confining flanges 2.

Thereafter, a sheet metal reinforcing jacket 9, having therein a pair of laterally-spaced openings 10, is applied about the outer peripheral surface of the matrix 1. Preferably, this is accomplished by the method claimed in Patent 2,331,679. However, in my method the laterally-spaced openings 10 are caused to register with the radially outwardly projecting ends 7 and 8 of the tubes 6 within the cavities 2a of the confining flanges 2 so that said ends 7 and 8 project radially outwardly therefrom. As set forth in Patent 2,331,679, the laterally-spaced edge portions 11 of the reinforcing jacket 9 project laterally outwardly beyond the lip portions 3 of the matrix 1 when the jacket 9 is first applied about the matrix 1. Consequently, the next step is to bend the projecting edge portions 11 backwardly over the lip portions 3 so as to positively hold the matrix 1 against lateral expansion.

Next, I apply suitable fittings to the outwardly projecting ends 7 and 8 of the tubular conduit portions 6, said fittings, preferably and as shown, being in the nature of elongated metallic heads 12 which are suitably soldered or the like to the extended ends 7 and 8. As shown, heads 12 are provided adjacent one end with screw-threaded openings 13 which extend radially outwardly therefrom, and which are adapted to receive either a screw-threaded steam inlet pipe or a screw-threaded bleeder valve or petcock. Adjacent their opposite ends the heads 12 are provided with chambers 14 which open laterally inwardly, as at 15. Wound generally spirally about the reinforcing jacket 9 between cavities 2a of the confining flanges 2 and secured thereto as by solder, is a length of tubular heating conduit 16. As shown, the opposite ends of the conduit 16 are bent laterally in opposite directions, as at 17, so as to enter the openings 15 in the heads 12.

From the above, it will be clear that steam under pressure entering one of the conduits 6 through its associated opening 13 will pass therearound, outwardly therefrom through the connected portions 15 and 17, through the spirally wound conduit 16, into the other conduit 6 in the other cavity 2a, through connected portions 15 and 17 associated with the other head 12, and outwardly from the other tube 6 through the other opening 13, after having passed about its associated confining flanges 2.

My invention has been thoroughly tested and found to be completely satisfactory for the accomplishment of the objects above set forth; and, while I have disclosed a commercial embodiment of my invention, it should be obvious that same is capable of modification without departure from the scope of the invention as defined by the appended claim.

What I claim is:

A device for applying treads to pneumatic tire casings, said device comprising an integral cylinder-like matrix formed from sheet metal and having its opposite side edge portions extending radially inwardly defining continuous, unbroken, unobstructed parallel V-shaped tread material confining flanges of uniform size and shape throughout the full peripheral extent thereof, a convolutions of tubular heating conduit totally received within each of said confining flanges with its opposite ends projecting radially outwardly therefrom in closely spaced relationship, a band-like reinforcing jacket about the external peripheral surface of said matrix covering over and concealing said V-shaped confining flanges and the heating conduit therein, said jacket having openings therein through which the radially outwardly projecting opposite ends of the heating conduit within said confining flanges project, inlet and outlet fittings on the radially outwardly projecting ends of said confining flange-contained heating conduits, and a spirally wound heating conduit secured to the peripheral outer surface of said band-like reinforcing jacket intermediate said confining flanges, opposite ends of said spirally wound conduit being connected to one of the radially outwardly projecting ends of the conduits in said spaced confining flanges through said fittings.

References Cited in the file of this patent

UNITED STATES PATENTS

| | | |
|---|---|---|
| 2,155,906 | Rihn et al. | Apr. 25, 1938 |
| 2,276,811 | Ward | Mar. 17, 1942 |
| 2,331,680 | Hawkinson | Oct. 12, 1943 |
| 2,339,696 | Hawkinson | Jan. 18, 1944 |
| 2,457,370 | Hawkinson | Dec. 28, 1948 |
| 2,469,828 | Johnson | May 10, 1949 |
| 2,558,345 | Dickman | June 26, 1951 |
| 2,644,984 | Crooker | July 14, 1953 |